(12) United States Patent　　(10) Patent No.: US 10,807,377 B2
Yamazaki et al.　　(45) Date of Patent: Oct. 20, 2020

(54) INK, INK CARTRIDGE, IMAGE FORMING METHOD, AND PRINTED MATTER

(71) Applicants: Takuya Yamazaki, Kanagawa (JP); Shigeyuki Harada, Shizuoka (JP); Takuya Saiga, Kanagawa (JP); Hiroshi Gotou, Kanagawa (JP); Yuusuke Koizuka, Kanagawa (JP); Koichiro Oyama, Kanagawa (JP)

(72) Inventors: Takuya Yamazaki, Kanagawa (JP); Shigeyuki Harada, Shizuoka (JP); Takuya Saiga, Kanagawa (JP); Hiroshi Gotou, Kanagawa (JP); Yuusuke Koizuka, Kanagawa (JP); Koichiro Oyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/292,376

(22) Filed: Mar. 5, 2019

(65) Prior Publication Data

US 2019/0276694 A1　　Sep. 12, 2019

(30) Foreign Application Priority Data

Mar. 7, 2018　　(JP) .................................. 2018-040961
Oct. 29, 2018　　(JP) .................................. 2018-202739

(51) Int. Cl.
*C09D 11/322*　　(2014.01)
*B41J 2/21*　　(2006.01)
(Continued)

(52) U.S. Cl.
CPC .............. *B41J 2/2107* (2013.01); *B41J 2/01* (2013.01); *C09D 11/322* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 2007/0032571 | A1* | 2/2007 | Furuno | ................ | C09D 11/101 523/160 |
| 2011/0306708 | A1* | 12/2011 | Hiraishi | ................ | C09D 11/32 524/90 |

(Continued)

FOREIGN PATENT DOCUMENTS

| JP | 10-510861 | 10/1998 |
| JP | 2009-506196 | 2/2009 |

(Continued)

*Primary Examiner* — Manish S Shah
(74) *Attorney, Agent, or Firm* — Oblon, McClelland, Maier & Neustadt, L.L.P.

(57) ABSTRACT

An ink, includes water; a coloring material; and a cross-linked copolymer having a structure unit represented by the following Chemical formula 1, and a structure unit represented by the following Chemical formula 2, Chemical formula 1

(Continued)

Chemical formula 2

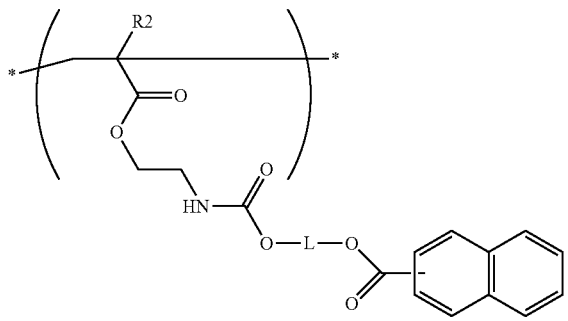

in Chemical formula 1, X represents a hydrogen atom or a cation and R1 represents a hydrogen atom or a methyl group, in Chemical formula 2, R2 represents a hydrogen atom or a methyl group, L represents an alkylene group having 2 to 18 carbon atoms, and * represents an atomic bond.

19 Claims, 1 Drawing Sheet

(51) Int. Cl.
*B41J 2/01* (2006.01)
*C09D 11/38* (2014.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | |
|---|---|---|
| 2014/0092180 A1 | 4/2014 | Matsuyama et al. |
| 2014/0120331 A1 | 5/2014 | Koizuka et al. |
| 2014/0141209 A1 | 5/2014 | Koizuka et al. |
| 2014/0198160 A1 | 7/2014 | Harada et al. |
| 2014/0199530 A1 | 7/2014 | Katoh et al. |
| 2014/0242352 A1 | 8/2014 | Naruse et al. |
| 2014/0267516 A1 | 9/2014 | Nonogaki et al. |
| 2014/0275401 A1 | 9/2014 | Katoh et al. |
| 2015/0056425 A1 | 2/2015 | Nagai et al. |
| 2015/0064418 A1 | 3/2015 | Matsuyama et al. |
| 2015/0064425 A1 | 3/2015 | Matsuyama et al. |
| 2015/0109382 A1 | 4/2015 | Naruse et al. |
| 2015/0116421 A1 | 4/2015 | Nonogaki et al. |
| 2015/0125672 A1 | 5/2015 | Katoh et al. |
| 2015/0252203 A1 | 9/2015 | Matsuyama et al. |
| 2015/0259555 A1 | 9/2015 | Katoh et al. |
| 2015/0291817 A1 | 10/2015 | Katoh et al. |
| 2015/0307734 A1 | 10/2015 | Nonogaki et al. |
| 2015/0376425 A1 | 12/2015 | Hakiri et al. |
| 2016/0017075 A1 | 1/2016 | Harada et al. |
| 2016/0032037 A1 | 2/2016 | Harada et al. |
| 2016/0075892 A1 | 3/2016 | Harada et al. |
| 2016/0102162 A1 | 4/2016 | Harada et al. |
| 2016/0130452 A1 | 5/2016 | Katoh et al. |
| 2016/0168292 A1 | 6/2016 | Fukuoka et al. |
| 2016/0222234 A1 | 8/2016 | Matsuyama et al. |
| 2016/0362572 A1* | 12/2016 | Matsuyama ......... B41J 2/17503 |
| 2016/0376455 A1* | 12/2016 | Katoh .................. B41J 2/1752 428/195.1 |
| 2017/0073533 A1 | 3/2017 | Fukuoka et al. |
| 2017/0121544 A1 | 5/2017 | Koizuka et al. |
| 2017/0158794 A1 | 6/2017 | Harada et al. |
| 2017/0174918 A1 | 6/2017 | Yanagawa et al. |
| 2017/0355868 A1 | 12/2017 | Saiga et al. |

FOREIGN PATENT DOCUMENTS

| | | |
|---|---|---|
| JP | 2009-515007 | 4/2009 |
| JP | 2011-105866 | 6/2011 |
| JP | 2011-144354 | 7/2011 |
| JP | 2013-538275 | 10/2013 |
| JP | 2016-196621 | 11/2016 |
| JP | 2017-101160 | 6/2017 |
| JP | 2017-165965 | 9/2017 |
| WO | WO1996/018688 A1 | 6/1996 |
| WO | WO2007/027625 A2 | 3/2007 |
| WO | WO2007/053564 A2 | 5/2007 |
| WO | WO2009/014242 A1 | 1/2009 |
| WO | WO2012/030890 A2 | 3/2012 |

* cited by examiner

INK, INK CARTRIDGE, IMAGE FORMING METHOD, AND PRINTED MATTER

CROSS-REFERENCE TO RELATED APPLICATIONS

This patent application is based on and claims priority pursuant to 35 U.S.C. § 119 to Japanese Patent Application Nos. 2018-040961 and 2018-202739, filed on Mar. 7, 2018 and Oct. 29, 2018, respectively, in the Japan Patent Office, the entire disclosures of which are hereby incorporated by reference herein.

BACKGROUND

Technical Field

The present invention relates to an ink, an ink cartridge, an image forming method, and printed matter.

Description of the Related Art

Advantages of an inkjet recording method is that the process is simple and full colorization is easy in comparison with other recording methods. Therefore, an inkjet device can produce high resolution images even with a simple configuration. For this reason, the inkjet recording is being widely employed from home to office, commercial printing, and industrial printing. In such an inkjet recording method, aqueous ink compositions using water-soluble dyes as coloring material are used. However, its water resistance and light resistance are inferior so that development of a pigment ink using a water-insoluble pigment is in progress as a substitute of the water-soluble dye. For inkjet ink printing for office use, recording media, typically plain paper, are used and high image density is demanded. In general, when images are printed on plain paper using pigment ink, the pigment ink does not stay on the surface of the paper but permeates the paper, so that the density of the pigment on the surface decreases and consequently the image density lowers. Image density increases if pigment concentration in the ink is increased. However, the ink becomes viscous, thereby degrading the discharging stability of the ink.

In addition, technologies to stably form clear and vivid images with higher definitions in higher performance are demanded in the fields of commercial printing and industrial printing. As the recording medium, coated paper, art paper, non-permeating film such as polyethylene terephthalate (PET) film, etc. are used in addition to plain paper. Therefore, ink highly responsive to such recording media is demanded. In the inkjet recording method, a hydrophilic organic solvent is added to an aqueous ink to prevent curling of plain paper or to increase drying speed and prevent beading by improving the permeability of ink in the case of coated paper or art paper. Beading is a phenomenon in which adjacent dots are joined on a recording medium, thereby creating irregular voids, increasing density, etc., which has an adverse impact on image quality.

SUMMARY

According to the present invention, provided is an improved ink which comprises water, a coloring material, and a cross-linked material comprising a structure unit represented by the following Chemical formula 1 and a structure unit represented by the following Chemical formula 2,

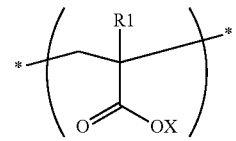

Chemical formula 1

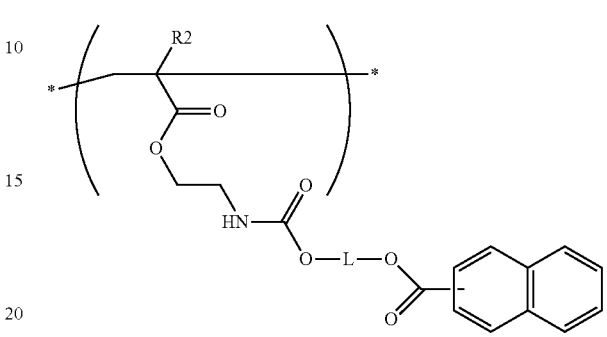

Chemical formula 2 in Chemical formula 1, X represents a hydrogen atom or a cation and R1 represents a hydrogen atom or a methyl group, in Chemical formula 2, R2 represents a hydrogen atom or a methyl group, L represents an alkylene group having 2 to 18 carbon atoms, and * represents an atomic bond.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
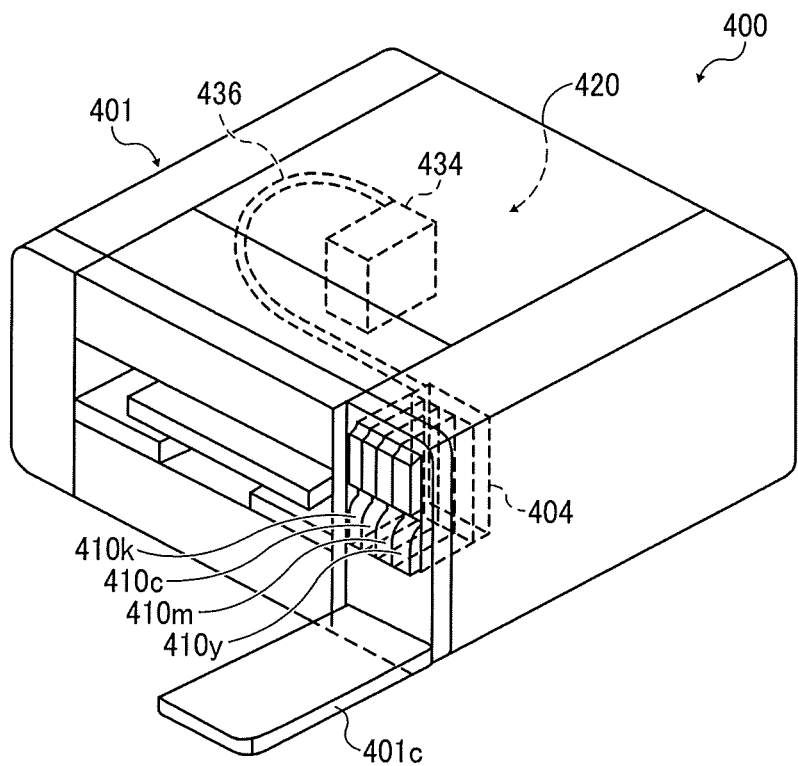
FIG. 1 is a diagram illustrating a perspective view of an example of an inkjet recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Unlike an aqueous dye ink prepared by dissolving a dye in water, the aqueous pigment ink for use in the inkjet recording method described above or pens and pencils requires stable dispersion of a water-insoluble pigment in water for a long period of time. Therefore, various pigment dispersants have been developed. For example, a graft polymer has been proposed which contains an aromatic ring at a side chain.

Also, a method of using a copolymer having a naphthyl group has been proposed in an attempt to manufacture an ink having good storage stability, high image density, and good beading resistance.

However, in the method mentioned above, image density may decrease when a printed image with an ink containing the copolymer is heated and dried.

According to the present disclosure, an ink is provided with which an image having a high image density can be obtained even when the image is thermally dried.

Ink

The ink of the present disclosure comprises water, a coloring material, and a cross-linked material comprising a structure unit represented by the following Chemical formula 1 and a structure unit represented by the following Chemical formula 2. As an embodiment, the ink may further comprise a copolymer comprising a cross-linked structure comprising the structure unit represented by the following Chemical formula 1, the structure unit represented by the following Chemical formula 2, and a cross-linking agent. This embodiment of the present disclosure will be described in detail below.

Chemical formula 1

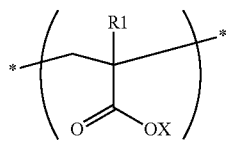

Chemical formula 2

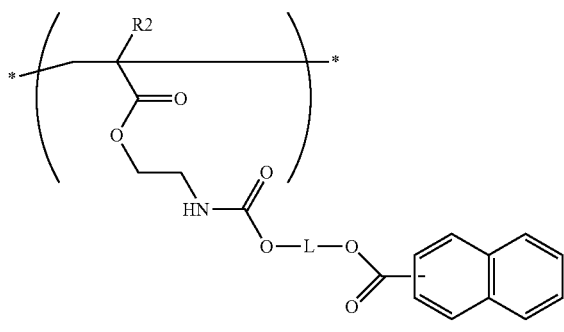

In Chemical formula 1, X represents a hydrogen atom or a cation and R1 represents a hydrogen atom or a methyl group.

In Chemical formula 2, R2 represents a hydrogen atom or a methyl group, L represents an alkylene group having 2 to 18 carbon atoms, and * represents an atomic bond.

Structure Unit Represented by Chemical Formula 1

Specific examples of the structure unit represented by Chemical formula 1 are illustrated below but are not limited thereto.

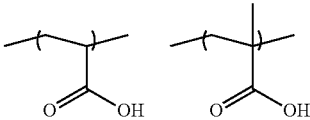

In Chemical formula 1, X represents a hydrogen atom or a cation. When X is a cation, the oxygen adjacent to the cation is existent as $O^-$.

Specific examples of the cation include, but are not limited to, sodium ion, potassium ion, lithium ion, tetramethyl ammonium ion, tetraethyl ammonium ion, tetrapropyl ammonium ion, tetrabutyl ammonium ion, tetrapentyl ammonium ion, tetrahexyl ammonium ion, triethylmethyl ammonium ion, tributylmethyl ammonium ion, trioctylmethyl ammonium ion, 2-hydroxyethyl trimethyl ammonium ion, tris(2-hydroxyethyl)methyl ammonium ion, propyltrimethyl ammonium ion, hexyltrimethyl ammonium ion, octyltrimethyl ammonium ion, nonyltrimethyl ammonium ion, decyltrimethyl ammonium ion, dodecyltrimerthyl ammonium ion, tetradecyltrimethyl ammonium ion, hexadecyl trimethyl ammonium ion, octadecyl trimethyl ammonium ion, didodecyl dimethyl ammonium ion, ditetradecyl dimethyl ammonium ion, dihexyadecyl dimethyl ammonium ion, dioctadecyl dimethyl ammonium ion, ethylhexadecyl dimethyl ammonium ion, ammonium ion, dimethyl ammonium ion, trimethyl ammonium ion, monoethyl ammonium ion, diethyl ammonium ion, triethyl ammonium ion, monoethanol ammonium ion, diethanol ammonium ion, triethanol ammonium ion, methyl ethanol ammonium ion, methyldiethanol ammonium ion, dimethylethanol ammonium ion, monopropanol ammonium ion, dipropanol ammonium ion, tripropanol ammonium ion, isopropanol ammonium ion, morpholinium ion, N-methyl morpholinium ion, N-methyl-2-pyrolidonisum ion, and 2-pyrolidonium ion.

The structure unit represented by Chemical formula 1 illustrated above is formed by copolymerization of monomers having anionic groups.

Examples of the monomer having an anionic group are unsaturated carboxylic acid monomers, unsaturated sulfonic acid monomers, and unsaturated phosphoric acid monomers. Specific examples of the unsaturated carboxylic acid monomers include, but are not limited to, acrylic acid, methacrylic acid, itaconic acid, fumaric acid, and maleic acid.

Specific examples of unsaturated sulfonic acid monomers include, but are not limited to, styrene sulfonic acid, 2-acrylamide-2-methyl propane sulfonic acid.

Specific examples of unsaturated phosphoric acid monomers include, but are not limited to, vinyl phosphoric acid, vinyl phosphate, bis(methcryloxyethyl)phosphate, diphenyl-2-acryloyloxy ethylphosphate, disphenyl-2-methacryloyloxy ethylphosphate, and dibutyl-2-acryloyloxy ethylphosphate.

Of these, monomers having carboxylic groups are preferable and acrylic acid and methacrylic acid are more preferable in terms of storage stability.

The monomer having an anionic group can be used alone or in combination.

The structure unit having an anionic group may be neutralized by a base.

Specific examples of the base include, but are not limited to, sodium hydroxide, potassium hydroxide, lithium hydroxide, tetramethyl ammonium hydroxide, tetraethyl ammonium hydroxide, tetrapropyl ammonium hydroxide, tetrabutyl ammonium hydroxide, tetrapentyl ammonium hydroxide, tetrahexyl ammonium hydroxide, triethylmethyl ammonium hydroxide, tributylmethyl ammonium hydroxide, trioctylmethyl ammonium hydroxide, 2-hydroxyethyl trimethyl ammonium hydroxide, tris(2-hydroxyethyl) methyl ammonium hydroxide, propyltrimethyl ammonium hydroxide, hexyltrimethyl ammonium hydroxide, octyltrimethyl ammonium hydroxide, nonyltrimethyl ammonium hydroxide, decyltrimethyl ammonium hydroxide, dodecyltrimerthyl ammonium hydroxide, tetradecyltrimethyl ammonium hydroxide, hexadecyl trimethyl ammonium hydroxide, octadecyl trimethyl ammonium hydroxide, didodecyl dimethyl ammonium hydroxide, ditetradecyl dimethyl ammonium hydroxide, dihexyadecyl dimethyl ammonium hydroxide, dioctadecyl dimethyl ammonium hydroxide, ethylhexadecyl dimethyl ammonium hydroxide, ammonium water, dimethyl amine, trimethyl amine, monoethyl amine, diethyl amine, triethyl amine, monoethanol amine, diethanol amine, triethanol amine, methyl ethanol amine, methyldiethanol amine, dimethylethanol amine, monopropanol amine, dipropanol amine, tripropanol amine, isopropanol amine, morpholine, N-methyl morpholine, N-methyl-2-pyrolidone, and 2-pyrolidone.

These bases serving as neutralizing agents can be used alone or mixed in combination.

The structure unit having an anionic group can be neutralized when the monomer having an anionic group is co-polymerized or when the copolymer is dissolved.

Structure Unit Represented by Chemical Formula 2

In Chemical formula 2, R2 represents a hydrogen atom or a methyl group and L represents an alkylene group having 2 to 18 carbon atoms.

The alkylene group having 2 to 18 carbon atoms can be independently substituted with a methyl group, an ethyl group, a propyl group, or a butyl group. L is preferably an alkylene group having 2 to 16 carbon atoms and more preferably an alkylene group having 2 to 6 carbon atoms.

Specific examples of the structure unit represented by Chemical formula 2 are illustrated below but the present disclosure is not limited thereto.

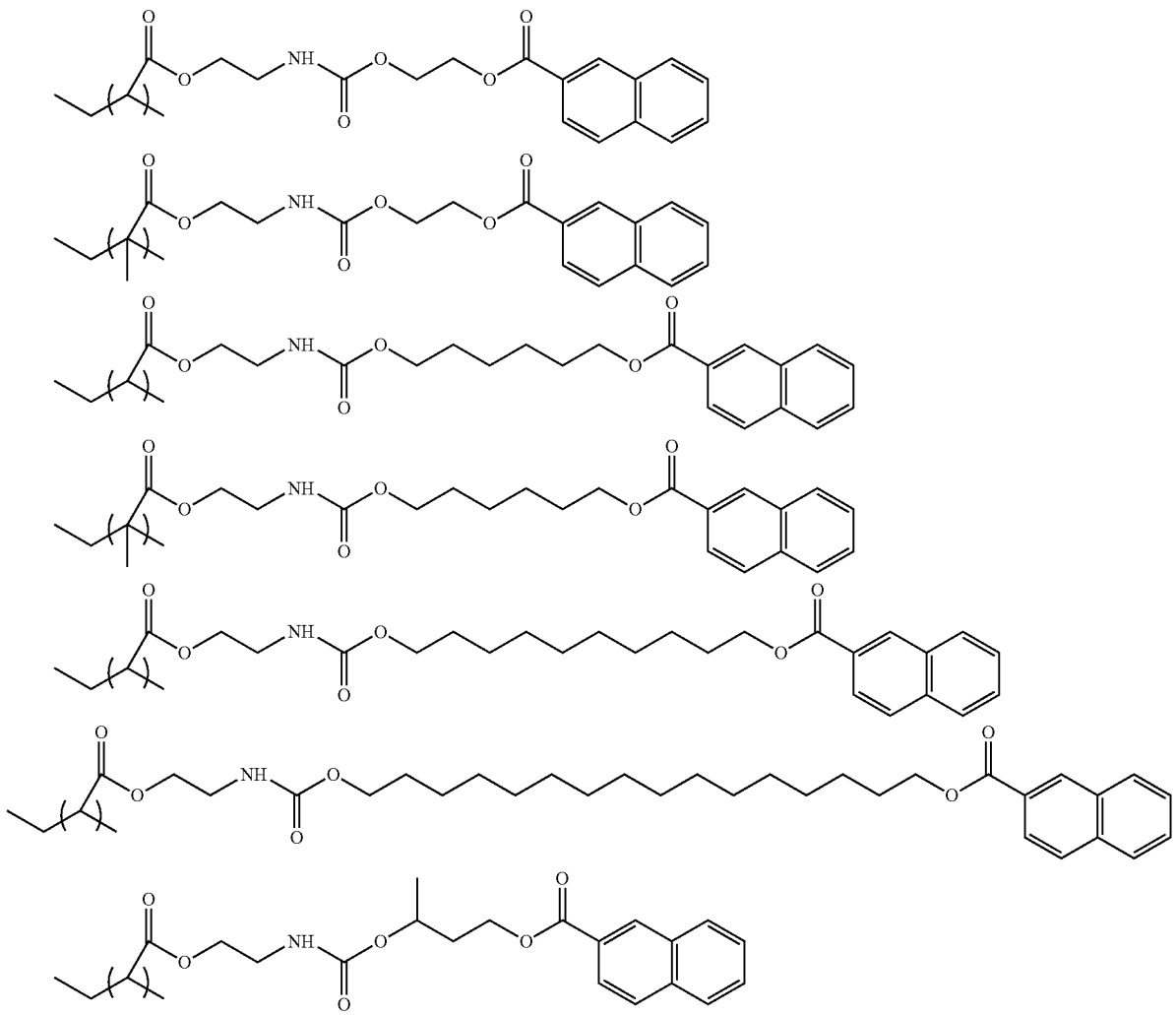

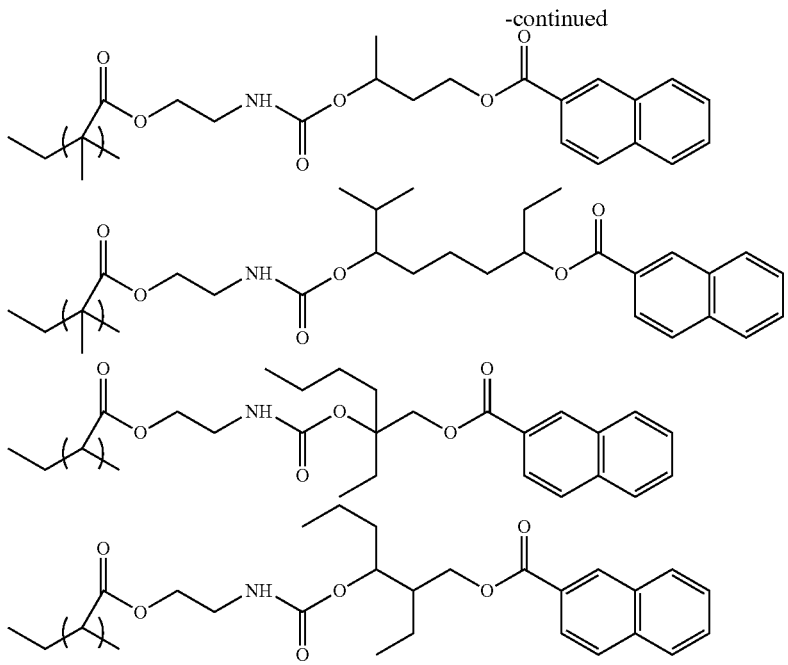

In the structure unit represented by Chemical formula 2, the naphtyl group existing at the distal end via alkylene group having an open end (in other words, pendant structure site) has an excellent pigment adsorption power due to π-π stacking with pigments serving as a coloring material in an ink.

As understood from the description "naphtyl group existing at the distal end via alkylene group in the pendant structure site", the structure unit represented by Chemical formula 2 may be typically the main chain of a copolymer having a pendant group such as naphthyl group at a distal end pendulating via an alkylene group. However, this does not exclude a case in which a portion is included in a side chain.

For example, it is well known that it is difficult to completely exclude secondarily radical polymerization reaction that produces fork structures.

In addition, when a pigment dispersion in which a pigment is dispersed in water is prepared with the copolymer of the present disclosure, the copolymer tends to be adsorbed to the surface of the pigment due to the naphtyl group present at the end of the side chain of the copolymer and the adsorption power with the pigment is so strong that the obtained dispersion is stabilized with a good dispersibility for an extended period of time.

Composition Ratio of Copolymer

The molar ratio of the structure unit represented by Chemical formula 1 to the structure unit represented by Chemical formula 2 ranges from 0.1/1 to 10/1, preferably from 0.3/1 to 5/1, and more preferably from 0.5/1 to 3/1 in terms of the adsorption power of a pigment. The mass ratio of the total of the structure unit represented by Chemical formula 1 and the structure unit represented by Chemical formula 2 to the entire of the copolymer is from 0.37 to 0.98, preferably from 0.54 to 0.95, and more preferably from 0.66 to 0.92.

Molecular Weight of Copolymer

The weight average molecular weight of the copolymer in the present disclosure is preferably from 5,000 to 50,000, more preferably from 5,000 to 40,000, and particularly preferably from 15,000 to 40,000 in polystyrene conversion. When the weight average molecular weight is within this preferable range, the advantage is that a high image density and good storage stability are obtained when used for ink.

Other Monomers

The copolymer of the present disclosure optionally has a structure unit formed of other polymerizable monomers in addition to the structure unit represented by Chemical formula 1 and the structure unit represented by Chemical formula 2.

Such other polymerizable monomers are not particularly limited and can be selected to suit to a particular application. Examples thereof are polymerizable hydrophobic monomers, polymerizable hydrophilic monomers, and polymerizable surfactants.

Specific examples of the polymerizable hydrophobic monomer include, but are not limited to, unsaturated ethylene monomers having aromatic ring such as styrene, α-methyl styrene, 4-t-butyl styrene, and 4-chloromethyl styrene; (meth)acrlic acid alkyl such as methyl (meth)acrylate, ethyl(meth)acrylate, (meth)acrylic acid-n-butyl, dimethyl maleate, dimethyl itaconate, dimethyl fumarate, lauryl(meth)acrylate (C12), tridecyl(meth)acrylate (C13), tetradecyl(meth)acrylate (C14), pentadecyl(meth)acrylate (C15), hexadecyl(meth)acrylate (C16), heptadecyl(meth)acrylate (C17), nonadecyl(meth)acrylate (C19), eicosyl (meth)acrylate (C20), heneicosyl(meth)acrylate (C21), and docosyl(meth)acrylate (C22); and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-diemthyl-1-hexene, 4,4-demthyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene, and 1-dococene. These may be used alone or in combination of two or more thereof.

Specific examples of the polymerizable hydrophilic monomers include, but are not limited to, nonionic unsaturated ethylene monomers such as (meth)acrylic acid-2-hydroxyethyl, diethylene glycol mono(meth)acrylate, triethylene glycol mono(meth)acrylate, tetraethylene glycol mono (meth)acrylate, polyethylene glycol mono(meth)acrylate, (meth)acrylamide, N-methylol(meth)acrylamide, N-vinyl formamide, N-vinylacetoamide, N-vinylpyrolidone, acrylamide, N,N-dimethyl acrylamide, N-t-butyl acrylamide, N-octyl acrylamide, and N-t-octyl acrylamide.

One or more kinds of the polymerizable hydrophilic monomers and polymerizable hydrophobic monomers can be mixed and the mass ratio of the mixture to the structure unit represented by Chemical formula 1 and the structure unit represented by Chemical formula 2 is from 0.05 to 1.

The polymerizable surfactant is an anionic or nonionic surfactant having at least one radically-polymerizable unsaturated double bond group in its molecule.

Examples of the anionic surfactant include, but are not limited to, a hydrocarbon compound having a sulfate group such as an ammonium sulfate group ($-SO_3-NH_4^+$) and an allyl group ($-CH_2-CH=CH_2$), a hydrocarbon compound having a sulfate group such as ammonium sulfate group ($-SO_3-NH_4^+$) and a methacylic group [($-CO-C(CH_3)=CH_2$], and an aromatic hydrocarbon compound having a sulfate group such as ammonium sulfate group ($-SO_3-NH_4$) and a 1-propenyl group ($-CH=CH_2CH_3$).

The anionic surfactant is available on the market.

Specific examples include, but are not limited to, ELEMINOL JS-20 and RS-300 (both manufactured by Sanyo Chemical Industries, Ltd.) and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

The nonionic surfactant is, for example, a hydrocarbon compound or an aromatic hydrocarbon compound having 1-propenyl group ($-CH=CH_2CH_3$) and a polyoxyethylene group [$-(C_2H_4O)_n-H$].

Specific examples of the product of the nonionic surfactant available on the market include, but are not limited to, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

One or more kinds of the polymerizable surfactants can be mixed and the mass ratio of the mixture of the polymerizable surfactants to the total amount of the monomer forming the structure unit represented by Chemical formula 1 and the structure unit represented by Chemical formula 2 is from 0.001 to 0.1.

Cross-Linking Agent

The cross-linking agent in the present disclosure is not particularly limited and can be suitably selected to suit to a particular application. In terms of obtaining high image density even when images are thermally dried, a cross-linking agent having two or more epoxy groups in a molecule is particularly preferable.

Specific examples of the cross-linking agent having two or more epoxy groups in a molecule include, but are not limited to, ethyleneglycol diglycidylether, polyethyleneglycol diglycidylether, propyleneglycol diglycidylether, polypropyleneglycol diglycidylether, resorcinol diglycidylether, neopentylglycol diglycidylether, 1,6-hexane diol diglycidylether, dibromoneopentylglycol diglycidylether, hydrogenated bisphenol A diglycidylether, terephthalic acid diglycidylester, phthalic acid diglycidylester, hydrogenated diglycidylester sorbitol polyglycidyl ether, glycerol polyglycidyl ether, diglycerol polyglycidyl ether, polyglycerol glycidylether, trimethylol propane polyglycidyl ether, pentaerythritol glycidyl ether, and cresolnovolac type epoxy emulsion.

Synthesis Method of Copolymer

The copolymer in the present disclosure is obtained by copolymerizing the monomers represented by the following Chemical formula 3 and the following Chemical formula 4 under the presence of a radical polymerization initiator followed by reaction with a cross-linking agent.

Chemical formula 3

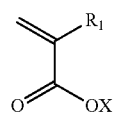

Chemical formula 4

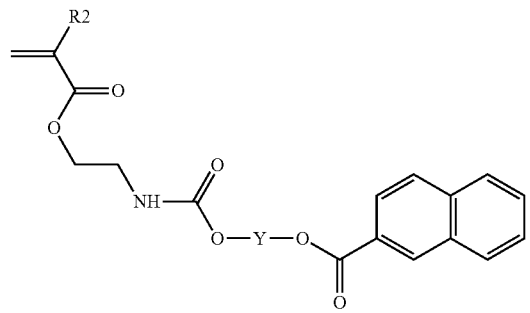

In Chemical formula 3, X represents a hydrogen atom or a cation and $R_1$ represents a hydrogen atom or a methyl group.

In Chemical formula 4, R2 represents a hydrogen atom or a methyl group and Y represents an alkylene group having 2 to 18 carbon atoms.

Specific examples of the monomer represented by Chemical formula 4 are illustrated below but are not limited thereto.

Monomer M-1

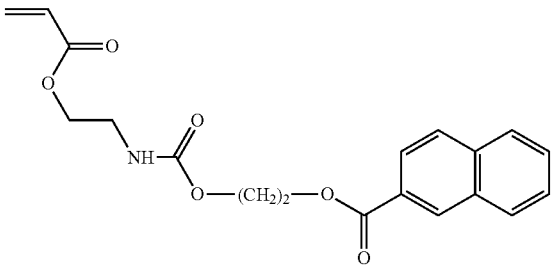

Monomer M-2

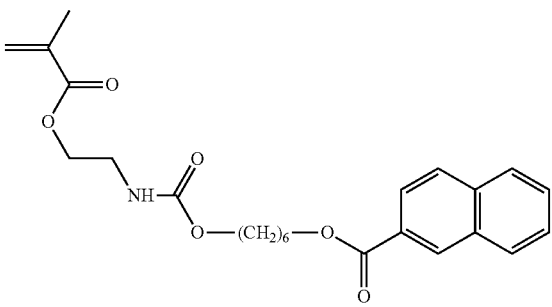

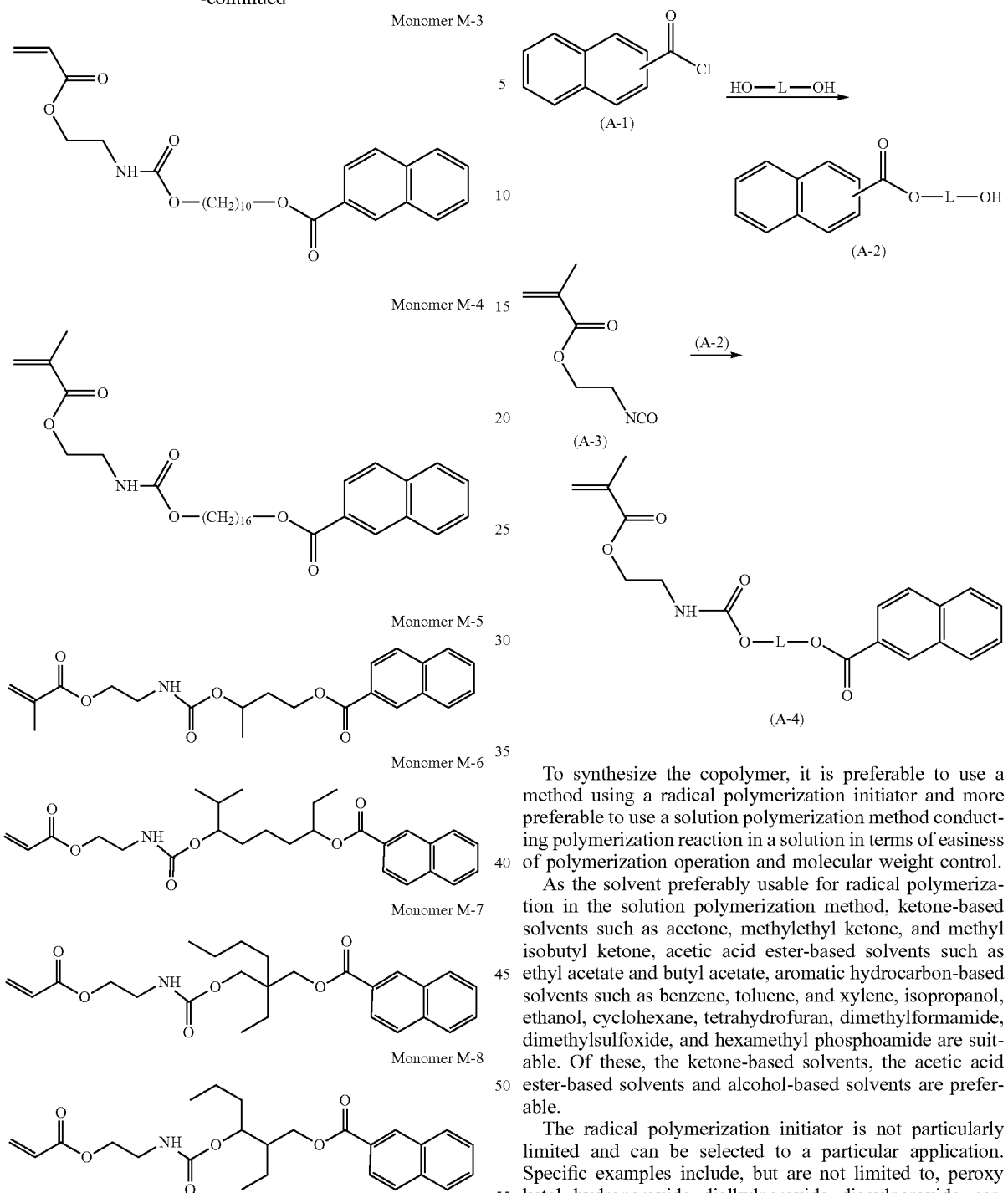

The monomer represented by Chemical formula 4 can be synthesized as follows and used. First, as in the following chemical reaction, naphthalene carboxylic acid hydroxy alkyl ester (A-2) is obtained by condensation reaction between naphthalene carbonyl chloride (A-1) and an excessive amount of a diol compound under the presence of acid acceptor such as amine and pyridine. Thereafter, the isocyanate compound (A-3) and the naphthalene carboxylic acid hydroxy alkyl ester (A-2) are caused to react to obtain the monomer (A-4) represented by Chemical formula 4.

To synthesize the copolymer, it is preferable to use a method using a radical polymerization initiator and more preferable to use a solution polymerization method conducting polymerization reaction in a solution in terms of easiness of polymerization operation and molecular weight control.

As the solvent preferably usable for radical polymerization in the solution polymerization method, ketone-based solvents such as acetone, methylethyl ketone, and methyl isobutyl ketone, acetic acid ester-based solvents such as ethyl acetate and butyl acetate, aromatic hydrocarbon-based solvents such as benzene, toluene, and xylene, isopropanol, ethanol, cyclohexane, tetrahydrofuran, dimethylformamide, dimethylsulfoxide, and hexamethyl phosphoamide are suitable. Of these, the ketone-based solvents, the acetic acid ester-based solvents and alcohol-based solvents are preferable.

The radical polymerization initiator is not particularly limited and can be selected to a particular application. Specific examples include, but are not limited to, peroxy ketal, hydroperoxide, dialkylperoxide, diacylperoxide, peroxydicarbonate, peroxyester, cyano-based azobisisobutylonitrile, azobis(2-methylbutylonitrile), azobis(2,2'-isovaleronitrile), and non-cyano-based dimethyl-2,2'-azobis isobutylate. Of these, in terms of easiness of molecular mass control and low decomposition temperature, organic peroxides and azo-based compounds are preferable and azo-based compounds are particularly preferable.

In addition, the amount of the radical polymerization initiator is not particularly limited and can be suitably selected to suit to a particular application. The mass ratio thereof to the total polymerizable monomers is preferably from 0.01 to 0.1.

To control the molecular weight of the copolymer mentioned above, a chain transfer agent may be optionally added.

Specific examples of the chain transfer agents include, but are not limited to, mercapto acetate, mercapto propionate, 2-propane thiol, 2-meracapto ethanol, thiophenol, dodecyl mercaptane, 1-dodecane thiol, and thioglycerol.

The amount of the cross-linking agent is not particularly limited and can be suitably selected to suit to a particular application. The proportion of the cross-linking agent in the copolymer is preferably from 0.1 to 10 percent by mass. The amount of the cross-linking agent means the remaining amount thereof in the copolymer after the cross-linking reaction between the copolymer and the cross-linking agent.

The polymerization temperature and the reaction temperature with the cross-linking agent are not particularly limited and can be suitably selected to a particular application. They are preferably from 50 to 150 degrees C. and more preferably from 60 to 100 degrees C. The polymerization time is not particularly limited and can be suitably selected to suit to a particular application. It is preferably from 3 to 48 hours.

Addition Amount of Copolymer

The amount of the copolymer in the ink in the present disclosure is not particularly limited and can be selected to suit to a particular application. The proportion is preferably from 0.05 to 10 percent by mass, more preferably from 0.1 to 10 percent by mass, and particularly from 0.3 to 5 percent by mass in a solid form.

When the proportion is not less than 0.05 percent by mass, pigment dispersibility and storage property of ink are improved. When the proportion is not greater than 10 percent by mass, viscosity becomes suitable for discharging ink from heads.

The copolymer is not particularly limited and can be used as a dispersant for a pigment and an additive for a pigment dispersion. Usage of the copolymer as a dispersant for a pigment further improves storage stability of ink containing a large amount of a water-soluble organic solvent.

The amount of the copolymer is not particularly limited and can be suitably selected to suit to a particular application when used as a pigment dispersant. The mass ratio of the copolymer to the pigment is preferably from 0.01 to 1 and more preferably from 0.05 to 0.8. When the amount is within this more preferable range, the advantage is that a high image density and good storage stability can be obtained.

Water

As the water, pure water and hyper pure water such as deionized water, ultrafiltered water, reverse osmosis water, and distilled water can be used.

The proportion of the water in the ink has no particular limit and can be suitably selected to suit to a particular application.

In terms of the drying property and discharging reliability of the ink, the proportion is preferably from 10 to 90 percent by mass and more preferably from 20 to 60 percent by mass.

Coloring Material

Pigments and dyes can be used as the coloring material. With regard to the adsorption power of the copolymer to the coloring material, pigments are superior to dyes. Moreover, pigments are preferable in terms of water resistance and light resistance.

The pigments are not particularly limited and suitably selected to suit to a particular application. For example, inorganic pigments or organic pigments for black or color are suitably selected. These can be used alone or in combination.

As the inorganic pigments, for example, it is possible to use carbon black manufactured by known methods such as contact methods, furnace methods, and thermal methods in addition to titanium oxide, iron oxide, calcium oxide, barium sulfate, aluminum hydroxide, barium yellow, cadmium red, and chrome yellow.

Specific examples of the pigments for black include, but are not limited to, carbon black (C.I. Pigment Black 7) such as furnace black, lamp black, acetylene black, and channel black, metals such as copper and iron (C.I. Pigment Black 11), and metal oxides such as titanium oxides, and organic pigments such as aniline black (C.I. Pigment Black 1).

It is suitable to use carbon black which is manufactured by a furnace method or channel method and has a primary particle diameter of from 15 to 40 nm, a specific surface area of from 50 to 300 $m^2/g$ according to Brunauer-Emmett-Teller (BET) method, a dibutylphthalate (DPB) absorption oil amount of from 40 to 150 ml/100 g, a volatile content of from 0.5 to 10 percent, and pH of from 2 to 9.

Specific examples of the organic pigments include, but are not limited to, azo pigments (azo lakes, insoluble azo pigments, azo pigment condensates, chelate azo pigments, etc.), polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinofuranone pigments), dye chelates (e.g., basic dye type chelate, acid dye type chelate), nitro pigments, nitroso pigments, and aniline black.

Of these pigments, in particular pigments having good affinity with water are preferably used.

Specific examples of the azo pigments include, but are not limited to, azo lake, insoluble azo pigments, azo pigment condensates, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and, Rhodamine B lake pigments.

Specific examples of the dye chelate include, but are not limited to, basic dye type chelates and acid dye type chelates.

The pigment for use in yellow ink is not particularly limited and can be suitably selected to suit to a particular application. Specific examples thereof include, but are not limited to, C.I.Pigment Yellow 1, C.I.Pigment Yellow 2, C.I.Pigment Yellow 3, C.I.Pigment Yellow 12, C.I.Pigment Yellow 13, C.I.Pigment Yellow 14, C.I.Pigment Yellow 16, C.I.Pigment Yellow 17, C.I.Pigment Yellow 73, C.I.Pigment Yellow 74, C.I.Pigment Yellow 75, C.I.Pigment Yellow 83, C.I.Pigment Yellow 93, C.I.Pigment Yellow 95, C.I.Pigment Yellow 97, C.I.Pigment Yellow 98, C.I.Pigment Yellow 114, C.I.Pigment Yellow 120, C.I.Pigment Yellow 128, C.I.Pigment Yellow 129, C.I.Pigment Yellow 138, C.I.Pigment Yellow 150, C.I.Pigment Yellow 151, C.I.Pigment Yellow 154, C.I.Pigment Yellow 155, C.I.Pigment Yellow 174, and C.I.Pigment Yellow 180.

The pigment for magenta ink is not particularly limited and can be suitably selected to suit to a particular application.

Specific examples include, but are not limited to, C.I.Pigment Red 5, C.I.Pigment Red 7, C.I.Pigment Red 12, C.I.Pigment Red 48 (Ca), C.I.Pigment Red 48 (Mn), C.I.Pigment Red 57 (Ca), C.I.Pigment Red 57:1, C.I.Pigment Red 112, C.I.Pigment Red 122, C.I.Pigment Red 123, C.I.Pigment Red 146, C.I.Pigment Red 168, C.I.Pigment Red 176, C.I.Pigment Red 184, C.I.Pigment Red 185, C.I.Pigment Red 202, and C.I.Pigment Violet 19.

The pigment for cyan is not particularly limited and can be suitably selected to suit to a particular application. Specific examples include, but are not limited to, C.I.Pigment Blue 1, C.I.Pigment Blue 2, C.I.Pigment Blue 3, C.I.Pigment Blue 15, C.I.Pigment Blue 15:3, C.I.Pigment Blue 15:4, C.I.Pigment Blue 15:34, C.I.Pigment Blue 16, C.I.Pigment Blue 22, C.I.Pigment Blue 60, C.I.Pigment Blue 63, C.I.Pigment Blue 66, C.I.Pat Blue 4, and C.I.Pat Blue 60.

By using C.I.Pigment Yellow 74 as yellow pigment, C.I.Pigment Red 122 and C.I.Pigment Violet 19 as magenta pigment, and C.I.Pigment Blue 15:3 as cyan pigment, a well-balanced ink having excellent color tone and light resistance is obtained.

Colorants newly manufactured for the present disclosure can be used for the ink of the present disclosure.

In addition, in terms of coloring of obtained images, it is suitable to use a self-dispersible pigment and preferable to use an anionic self-dispersible pigment. The anionic self-dispersible pigment is formed by introducing an anionic functional group to the surface of a pigment directly or via another atom group to stabilize dispersion.

As the pigment before dispersion is stabilized, variety of conventional pigments specified in, for example, WO-2009/014242, can be used.

In the anionic functional group, more than a half of hydrogen ions are dissociated at pH 7.0. Specific examples of the anionic functional groups include, but are not limited to, a carboxyl group, a sulfo group, and a phosphonic acid group. Of these, to improve the optical density of obtained images, a carboxyl group or a phosphonic acid group is preferable.

An anionic functional group is introduced into the surface of a pigment by, for example, oxidation treatment of carbon black.

As the oxidization treatment, for example, hypochlorite, ozone water, hydrogen peroxide, chlorite, or nitric acid are used. Alternatively, surface treatment is suitable using a diazonium salt disclosed in, for example, Japanese Patent No. 3808504, Japanese Translation of PCT International Application Publication No. JP-T-2009-515007, and Japanese Translation of PCT International Application Publication No. JP-T-2009-506196.

In addition, specific examples of the commercially available pigment having a surface into which a hydrophilic group is introduced include, but are not limited to, CW-1, CW-2, and CW-3 (all manufactured by Orient Chemical Industries Co., Ltd.), and CAB-O-JET200, CAB-O-JET300, and CAB-O-JET400 (all manufactured by Cabot Corporation).

The proportion of the pigment in the ink is not particularly limited and can be suitably selected to suit to a particular application. For example, it is preferably from 0.5 to 20 percent by mass and more preferably from 1 to 10 percent by mass.

As the dye, dyes classified into acidic dyes, direct dyes, basic dyes, reactive dyes, and food dyes in the color index can be used.

Specific examples of acidic dyes and food dyes include, but are not limited to, C.I. Acid Black 1, 2, 7, 24, 26, and 94, C.I. Acid Yellow 17, 23, 42, 44, 79, and 142, C.I. Acid Blue 9, 29, 45, 92, and 249, C.I. Acid Red 1, 8, 13, 14, 18, 26, 27, 35, 37, 42, 52, 82, 87, 89, 92, 97, 106, 111, 114, 115, 134, 186, 249, 254, and 289, C. I. Food Black 1 and 2, C. I. Food Yellow 3 and 4, and C. I. Food Red 7, 9, and 14.

Specific examples of direct dyes include, but are not limited to, C.I. Direct Black 19, 22, 32, 38, 51, 56, 71, 74, 75, 77, 154, (168), and 171, C.I. Direct Yellow 1, 12, 24, 26, 33, 44, 50, 86, 120, 132, 142, and 144, C.I. Direct Blue 1, 2, 6, 15, 22, 25, 71, 76, 79, 86, 87, 90, 98, 163, 165, 199, and 202, C.I. Direct Red 1, 4, 9, 13, 17, 20, 28, 31, 39, 80, 81, 83, 89, 225, and 227, and C.I. Direct Orange 26, 29, 62, and 102.

Specific examples of basic dyes include, but are not limited to, C.I. Basic Black 2 and 8, C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112.

Specific examples of reactive dyes include, but are not limited to, C. I. Reactive Black 3, 4, 7, 11, 12, and 17; C. I. Reactive Yellow 1, 5, 11, 13, 14, 20, 21, 22, 25, 40, 47, 51, 55, 65, and 67; C.I. Reactive Blue 1, 2, 7, 14, 15, 23, 32, 35, 38, 41, 63, 80, and 95; C.I. Reactive Red 1, 14, 17, 25, 26, 32, 37, 44, 46, 55, 60, 66, 74, 79, 96, and 97.

The ink of the present disclosure preferably includes an organic solvent in order to enhance the permeation of the ink into plain paper, coated paper, etc., thereby further reducing the occurrence of beading and preventing the ink from being dried utilizing moisturizing effect.

Organic Solvent

There is no specific limitation to the organic solvent for use in the present disclosure. For example, water-soluble organic solvents can be used. Examples include, but are not limited to, polyols, ethers such as polyol alkylethers and polyol arylethers, nitrogen-containing heterocyclic compounds, amides, amines, and sulfur-containing compounds.

Specific examples include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformami de, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzyl ether.

The polyol compounds having eight or more carbon atoms and glycolether compounds enhance permeability of ink for paper used as a recording medium.

The proportion of the organic solvent in the ink has no particular limit and can be suitably selected to suit to a particular application.

In terms of drying property and discharging reliability of ink, the proportion is preferably from 10 to 60 percent by mass and more preferably from 20 to 60 percent by mass.

The ink of the present disclosure preferably includes a surfactant in order to enhance the permeation of the ink into plain paper, coated paper, etc., thereby further reducing the occurrence of beading.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment.

Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates. These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsil oxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical Formula S-1

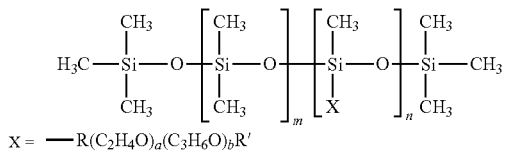

$X = \text{---} R(C_2H_4O)_a(C_3H_6O)_bR'$

In Chemical formula S-1, m, n, a, and b each, independently represent integers. R and R' each, independently represent alkyl groups and alkylene groups.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in the side chain thereof are preferable because these polymer compounds do not easily foam and the fluorochemical surfactant represented by the following Chemical formula F-1 or Chemical formula F-2 is more preferable.

Chemical formula F-1

In the compound represented by Chemical formula F-1, m is preferably 0 or an integer of from 1 to 10 and n is preferably 0 or an integer of from 1 to 40.

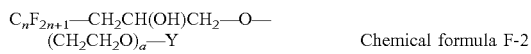

Chemical formula F-2

In the compound represented by Chemical formula F-2, Y represents H or $C_nF_{2n+1}$, where n represents an integer of from 1 to 6 or $CH_2CH(OH)CH_2$—$C_nF_{2n+1}$, where n represents an integer of from 4 to 6, or $C_pH_{2p+1}$, where p is an integer of from 1 to 19. "a" represents an integer of from 4 to 14.

As the fluorochemical surfactant, products available on the market may be used.

Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, it is preferably from 0.001 to 5 percent by mass and more preferably from 0.05 to 5 percent by mass in terms of excellent wettability and discharging stability and improvement on image quality.

The ink of the present disclosure may furthermore optionally contain, for example, a preservatives and fungicides, corrosion inhibitors, and pH regulators.

Preservatives and Fungicides

The preservatives and fungicides are not particularly limited. A specific example is 1,2-benzisothiazoline-3-one.

Corrosion Inhibitor

The corrosion inhibitor has no particular limitation.

Specific examples include, but are not limited to, acid sulfites and sodium thiosulfates.

pH Regulator

The pH regulator has no particular limit as long as it can control pH to not lower than 7

Specific examples include, but are not limited to, amines such as diethanol amine and triethanol amine.

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Rotational frequency: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably leveled on a recording medium and the drying time of the ink is shortened.

pH of the ink is preferably from 7 to 12 and more preferably from 8 to 11 in terms of prevention of corrosion of metal material in contact with liquid.

Method of Manufacturing Ink

The method of manufacturing the ink of the present disclosure includes obtaining a cross-linked material having the structure unit represented by Chemical formula 1 and the structure unit represented by Chemical formula 2 and mixing the cross-linked material with water and a coloring material.

Also, the ink of the present disclosure can be manufactured by dispersing or dissolving water, a coloring material, a copolymer comprising the structure unit represented by Chemical formula 1, the structure unit represented by Chemical formula 2, and a cross-linking agent, and the other optional component in an aqueous medium followed by stirring and mixing. The copolymer may be used as a pigment-dispersing resin to prepare a coloring material dispersion.

The materials can be dispersed by, for example, a sand mill, a homogenizer, a ball mill, a bead mill, a paint shaker, an ultrasonic dispersing machine, etc. Typically, a stirrer using a stirring blade, a magnetic stirrer, a high performance disperser etc., can be used for the mixing and stirring.

Recorded Matter

The recorded matter of the present disclosure includes a recording medium and an image formed on the recording medium with the ink of the present disclosure.

The recorded matter is obtained by an inkjet recording device executing an inkjet recording method.

Ink Container

The ink container (ink cartridge) of the present disclosure includes an ink containing unit to contain the ink of the present disclosure. Furthermore, the ink container may optionally include other members.

The container is not particularly limited. The form, the structure, the size, and the material thereof can be suitably determined to suit to a particular application. For example, a container having at least an ink containing unit made of aluminum laminate film, a resin film, etc. is suitable.

Recording Device and Recording Method

The image forming method (recording method) of the present disclosure includes applying the ink of the present disclosure to a recording medium and thermally drying the ink applied to the recording medium.

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing liquids, etc. to a recording medium and a method of recording utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc. in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as AO and a continuous printer capable of using continuous paper rolled up in a roll-like form as a recording medium.

Figure 2:
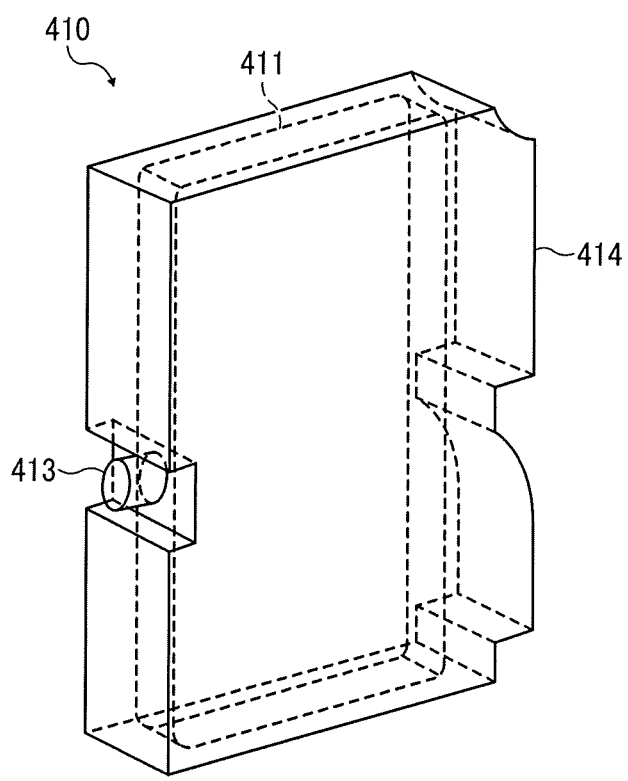
FIG. 2 is a diagram illustrating a perspective view of an example of a main tank of an inkjet recording device.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit 411 of each main tank 410 (410k, 410c, 410m, and 410y) for each color of black (K), cyan (C), magenta (M), and yellow (Y) is made of, for example, a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The main tank 410 is detachably attached to the cartridge holder 404. This enables each ink outlet 413 of the main tank 410 to communicate with a discharging head 434 for each color via a supplying tube 436 for each color so as to discharge the ink from a discharging head 434 to a recording medium.

Notably, the ink is applicable not only to the inkjet print method but can be widely applied to other methods.

Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

The usage of the ink of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (solid freeform fabrication object) as a material for 3D modeling.

The solid fabrication apparatus to fabricate a solid fabrication object can be any known device with no particular limit. For example, the apparatus includes a container, a supplying device, and a discharging device, a drier, etc. of ink. The solid fabrication object includes an object manufactured by repeated ink coating. In addition, the solid fabrication object includes a molded processed product manufactured by processing a structure having a substrate such as a recording medium to which the ink is applied. The molded processed product is manufactured from recorded matter or a structure having a sheet-like form, film-like form, etc. by, for example, heating drawing or punching. The molded processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto. Part and percent respectively represent parts by mass and percent by mass, unless otherwise specified.

The average molecular weight of the copolymer was obtained in the following manner.

Measuring of Average Molecular Weight of Copolymer

The average molecular weight of the copolymer was measured by gel permeation chromatography (GPC) under the following conditions:

Device: GPC-8020 (manufactured by TOSOH CORPORATION)

Column: TSK G2000 HXL and G4000 HXL (manufactured by TOSOH CORPORATION)

Temperature: 40 degrees C.

Solvent: tetrahydrofuran (THF)

Flow rate: 1.0 mL/min 1 mL of a copolymer having a concentration of 0.5 percent by mass was infused into the column. Using the molecular weight calibration curve obtained based on a simple dispersion polystyrene standard sample from the molecular weight distribution of the copolymer measured under the conditions specified above, the number average molecular weight Mn and the weight average molecular weight Mw of the copolymer were calculated.

SYNTHESIS EXAMPLE

Synthesis Example 1: Synthesis of Copolymer CP-1 Aqueous Solution 48.8 g (787 mmol) of ethylene glycol (manufactured by TOKYO CHEMICAL INDUSTRY CO., LTD.) was dissolved in 200 mL of methylene chloride (dichloromethane) and thereafter 21.8 g (275 mmol) of pyridine was further added. To this solution, a solution in which 50.0 g (262 mmol) of 2-naphthalene carbonyl chloride (manufacture by TOKYO CHEMICAL INDUSTRY CO., LTD.) was dissolved in 100 ml of methylene chloride was dripped in 30 minutes during stirring followed by stirring at room temperature for six hours. The thus-obtained reaction solution was rinsed with water and thereafter the organic phase was isolated followed by drying with magnesium sulfate and the solvent was distilled away. The residue was refined by silica gel column chromatography with a solvent mixture of methylene chloride and methanol in a volume ratio of 99:1 serving as an eluent to obtain 72.6 g of Compound A-1.

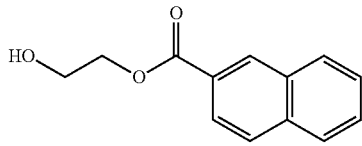

Compound A-1

32.4 g (150 mmol) of Compound A-1 was dissolved in 80 mL of super-dehydrated dichloromethane (manufactured by Wako Pure Chemical Industries, Ltd.). To this solution, 21.2 g (150 mmol) of 2-methacryloyloxyethyl isocyanate (Karenz MOI, manufactured by SHOWA DENKO K.K.) was dripped in one hour during stirring followed by stirring at 40 degrees C. for 12 hours. The residue was refined by silica gel column chromatography with a solvent mixture of methylene chloride and methanol with a volume ratio of 99:1 serving as an eluent to obtain 46.1 g of Monomer M-1 as the target product.

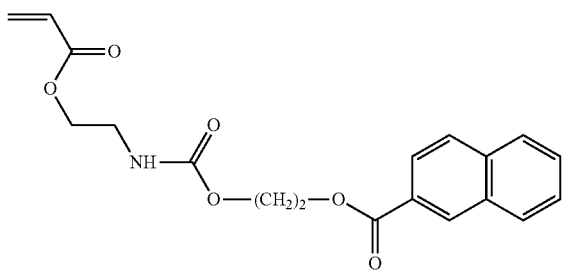

Monomer M-1

Next, 4.00 g (55.5 mmol) of acrylic acid (manufactured by Sigma-Aldrich Co. LLC.), 17.01 g (47.6 mmol) of Monomer M-1, and 0.721 g (4.39 mmol) of 2,2'-azoiso (butylonitrile) (manufactured by TOKYO CHEMICAL INDUSTRY CO., LTD.) were dissolved in 128 mL of methylethylketone (manufactured by Kanto Chemical Co., Inc.) to prepare a monomer solution. 32 mL of methylethyl ketone (manufactured by Kanto Chemical Co., Inc.) was placed in a reaction container followed by heating to 75 degrees C. in argon atmosphere. Thereafter, the monomer solution was dripped in one hour followed by stirring for five hours during reflux. The resultant was cooled down to room temperature and the thus-obtained reaction solution was dropped to hexane to precipitate a copolymer. The precipitated copolymer was filtrated followed by drying with a reduced pressure to obtain 21.57 g of a copolymer.

Thereafter, 20.00 g of the copolymer, 4.71 g (44.8 mmol) of diethanol amine, and 1.00 g (5.74 mmol) of polyethylene glycol glycidylether (Denacol EX-850, manufactured by Nagase ChemteX Corporation) were dissolved in 231.39 g of deionized water to prepare a copolymer solution. This copolymer solution was heated at 70 degrees C. in argon atmosphere followed by five-hour stirring to obtain 257.10 g of Copolymer CP-1 aqueous solution having a cross-linked structure (solid copolymer concentration of 10 percent by mass, weight average molecular weight (Mw) of 20,200, number average molecular weight (Mn) of 8,900).

Synthesis Examples 2 to 9: Synthesis of Copolymers CP-2 to CP-9 Aqueous Solution Copolymer CP-2 to CP-9 aqueous solutions were prepared in the same manner as in the synthesis of Copolymer CP-1 aqueous solution except that the diols and the cross-linking agents shown in Table 1 were used. All of the used cross-linking agents was Denacol manufactured by Nagase ChemteX Corporation.

TABLE 1

| Copolymer aqueous solution | Diol Kind | Cross-linking Agent Kind | Proportion (percent) in copolymer | Mw |
|---|---|---|---|---|
| CP-1 | Ethylene glycol | EX-850 | 5.0 | 20,200 |
| CP-2 | 1,6-Hexane diol | EX-850 | 2.5 | 13,400 |
| CP-3 | 1,16-Hexane diol | EX-850 | 10.0 | 38,000 |
| CP-4 | 1,3-butane diol | EX-850 | 0.1 | 11,000 |
| CP-5 | Ethylene glycol | EX-830 | 5.0 | 24,200 |
| CP-6 | Ethylene glycol | EX-941 | 5.0 | 25,800 |
| CP-7 | Ethylene glycol | EX-313 | 5.0 | 20,900 |
| CP-8 | Ethylene glycol | EX-512 | 5.0 | 21,200 |
| CP-9 | Ethylene glycol | EX-614 | 5.0 | 27,900 |

Preparation Example 1 of Pigment Dispersion

Preparation of Pigment Dispersion PD-1

Deionized water was added to 60 g of Copolymer CP-1 aqueous solution of Synthesis Example 1 to make the total amount of the aqueous solution to be 80.0 parts. 20.0 parts of carbon black (NIPEX150, manufactured by Degussa AG) was added to 80.0 parts of the thus-obtained aqueous solution followed by stirring for 12 hours. The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 98.0 parts of Pigment dispersion PD-1 (solid pigment portion concentration of 20 percent).

Preparation Examples 2 to 12 of Pigment Dispersion

Preparation of Pigment Dispersion PD-2 to PD-12

Pigment dispersions PD-2 to PD-12 were prepared in the same manner as in Preparation Example 1 of Pigment dispersion except that Copolymers CP-2 to CP-9 were used in an amount (parts) shown in Table 2 and the pigments shown in Table 2 were used.

TABLE 2

| Dispersion | Copolymer | | Deionized water parts by mass | Kind of pigment | | | |
|---|---|---|---|---|---|---|---|
| | Kind | aqueous solution parts by mass | | Carbon black parts by mass | Pigment Red 122 parts by mass | Pigment Blue 15:3 parts by mass | Pigment Yellow 74 parts by mass |
| PD-1 | CP-1 | 60 | 20 | 20 | | | |
| PD-2 | CP-2 | 60 | 20 | 20 | | | |
| PD-3 | CP-3 | 60 | 20 | 20 | | | |
| PD-4 | CP-4 | 60 | 20 | 20 | | | |
| PD-5 | CP-5 | 60 | 20 | 20 | | | |
| PD-6 | CP-6 | 60 | 20 | 20 | | | |
| PD-7 | CP-7 | 60 | 20 | 20 | | | |
| PD-8 | CP-8 | 60 | 20 | 20 | | | |
| PD-9 | CP-9 | 60 | 20 | 20 | | | |
| PD-10 | CP-1 | 60 | 20 | | 20 | | |
| PD-11 | CP-1 | 60 | 20 | | | 20 | |
| PD-12 | CP-1 | 60 | 20 | | | | 20 |

The used pigments shown in Table 2 were the products below.

Carbon Black (NIPEX 150, manufactured by Degussa AG)

Pigment Red 122 (Toner magenta E02, manufactured by Clariant (Japan) K.K.)

Pigment Blue 15:3 (CHROMOFINE BLUE A-220JC, manufactured by Dainichiseika Color & Chemicals Mfg. Co., Ltd.)

Pigment Yellow 74 (Fast Yellow 531, manufactured by Dainichiseika Color & Chemicals Mfg. Co., Ltd.)

Example 1

Preparation of Ink GJ-1

40.0 parts of Pigment dispersion PD-1, 10.0 parts of glycerin, 15.0 parts of 1,3-butane diol, 10.0 parts of 3-methoxy-N,N-dimethyl propionamide, 5.0 parts of ethylene glycol monobutyl ether, 1.0 part of 2-ethyl-1,3-hexane diol, 1.0 part of UNIDYNE™ DSN-403N (manufactured by DAIKIN INDUSTRIES, LTD.), and 18.0 parts of deionized water were mixed and stirred for one hour. Thereafter, the mixture was filtrated with a membrane filter having an average pore diameter of 1.2 mm to prepare Ink GJ-1 of Example 1.

Examples 2 to 12

Preparation of Ink GJ-2 to GJ-12

Ink GJ-2 to Ink GJ-12 of Examples 2 to 12 were prepared in the same manner as in Example 1 except that the ink formulations were changed as shown in Table 3.

TABLE 3

| Example | Ink | Pigment dispersion | parts by mass | Water-soluble organic solvent | | | |
|---|---|---|---|---|---|---|---|
| | | | | Glycerin | 1,3-butane diol | 3-methoxy-N,N-dimethyl propionamide | 3-ethyl-3-hydroxymethyl oxetane |
| Example 1 | GJ-1 | PD-1 | 40 | 10 | 15 | 10 | |
| Example 2 | GJ-2 | PD-2 | 40 | 20 | 10 | | 10 |
| Example 3 | GJ-3 | PD-3 | 40 | 20 | | | 15 |
| Example 4 | GJ-4 | PD-4 | 40 | 20 | | | 15 |
| Example 5 | GJ-5 | PD-5 | 40 | 15 | 15 | | |
| Example 6 | GJ-6 | PD-6 | 40 | 15 | | 15 | |
| Example 7 | GJ-7 | PD-7 | 40 | 15 | 15 | 5 | |
| Example 8 | GJ-8 | PD-8 | 40 | 20 | | 15 | |
| Example 9 | GJ-9 | PD-9 | 40 | 10 | 10 | | |
| Example 10 | GJ-10 | PD-10 | 40 | 15 | | 20 | |
| Example 11 | GJ-11 | PD-11 | 40 | 10 | | | 10 |
| Example 12 | GJ-12 | PD-12 | 40 | 10 | 10 | | 15 |

TABLE 3-continued

| Example | Ink | Water-soluble organic solvent | | | | Surfactant UNIDYNE™ DSN-403N | Deionized water |
|---|---|---|---|---|---|---|---|
| | | Ethylene glycol monobutyl ether | 2-pyroridone | 2-ethyl-1,3-hexanediol | 2,2,4-trimethyl-1,3-pentanediol | | |
| Example 1 | GJ-1 | 5 | | 1 | | 1 | 18 |
| Example 2 | GJ-2 | | | | 1 | 1 | 18 |
| Example 3 | GJ-3 | | 5 | | 1 | 1 | 18 |
| Example 4 | GJ-4 | | 5 | | | 1 | 19 |
| Example 5 | GJ-5 | | 10 | | 1 | 1 | 18 |
| Example 6 | GJ-6 | | 10 | | 1 | 1 | 18 |
| Example 7 | GJ-7 | 5 | | 1 | | 1 | 18 |
| Example 8 | GJ-8 | 5 | | 1 | | 1 | 18 |
| Example 9 | GJ-9 | 10 | 10 | | 1 | 1 | 18 |
| Example 10 | GJ-10 | 5 | | 1 | | 1 | 18 |
| Example 11 | GJ-11 | 10 | 10 | | 1 | 1 | 18 |
| Example 12 | GJ-12 | | 5 | | 1 | 1 | 18 |

Comparative Example 1

Synthesis of Copolymer RCP-2

48.8 g (787 mmol) of ethylene glycol (manufactured by TOKYO CHEMICAL INDUSTRY CO., LTD.) was dissolved in 200 mL of methylene chloride (dichloromethane) and thereafter 21.8 g (275 mmol) of pyridine was further added. To this solution, a solution in which 50.0 g (262 mmol) of 2-naphthalene carbonyl chloride (manufacture by TOKYO CHEMICAL INDUSTRY CO., LTD.) was dissolved in 100 ml of methylene chloride was dripped in 30 minutes during stirring followed by stirring at room temperature for six hours. The thus-obtained reaction solution was rinsed with water and thereafter the organic phase was isolated followed by drying with magnesium sulfate and the solvent was distilled away. The residue was refined by silica gel column chromatography with a solvent mixture of methylene chloride and methanol in a volume ratio of 99:1 serving as an eluent to obtain 72.6 g of Compound A-1.

Compound A-1

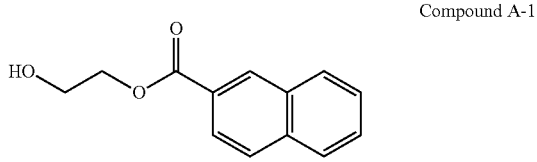 [SMILES: O=C(OCCO)c1ccc2ccccc2c1]

32.4 g (150 mmol) of Compound A-1 was dissolved in 80 mL of super-dehydrated dichloromethane (manufactured by Wako Pure Chemical Industries, Ltd.). To this solution, 21.2 g (150 mmol) of 2-methacryloyloxyethyl isocyanate (Karenz MOI, manufactured by SHOWA DENKO K.K.) was dripped in one hour during stirring followed by stirring at 40 degrees C. for 12 hours. The residue was refined by silica gel column chromatography with a solvent mixture of methylene chloride and methanol in a volume ratio of 99:1 serving as an eluent to obtain 46.1 g of Monomer M-1 as the target product.

Monomer M-1

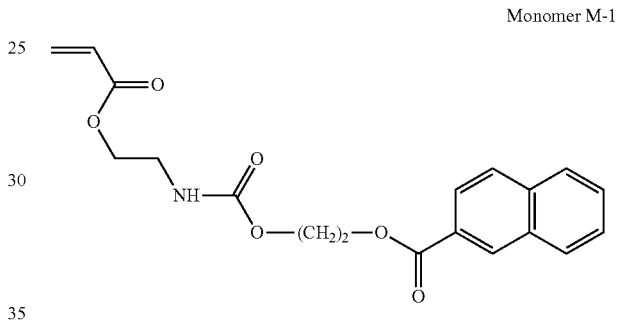

Next, 3.80 g (44.1 mmol) of acrylic acid (manufactured by Sigma-Aldrich Co. LLC.), 16.01 g (43.1 mmol) of Monomer M-1, and 0.721 g (4.39 mmol) of 2,2'-azoiso (butylonitrile) (manufactured by TOKYO CHEMICAL INDUSTRY CO., LTD.) were dissolved in 128 mL of methylethylketone (manufactured by Kanto Chemical Co., Inc.) to prepare a monomer solution. 32 mL of methylethyl ketone (manufactured by Kanto Chemical Co., Inc.) was placed in a reaction container followed by heating to 75 degrees C. in argon atmosphere. Thereafter, the monomer solution was dripped in one hour followed by stirring for five hours during reflux. The resultant was cooled down to room temperature and the thus-obtained reaction solution was dropped to hexane to precipitate a copolymer. The precipitated copolymer was filtrated followed by drying with a reduced pressure to obtain 19.57 g of a copolymer RCP-2 (weight average molecular weight (Mw) of 20,200, number average molecular weight (Mn) of 8,900).

Preparation of Pigment Dispersion RPD-2

6.0 parts of Copolymer RCP-2 was dissolved in 50.0 parts of diethanol amine aqueous solution in such a manner that pH was 8.0. Moreover, deionized water was added to make the total amount of the aqueous solution to be 80.0 parts. 20.0 parts of carbon black (NIPEX150, manufactured by Degussa AG) was added to 80.0 parts of the thus-obtained aqueous solution followed by stirring for 12 hours.

The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 97.0 parts of Pigment dispersion RPD-2 (solid pigment portion concentration of 20 percent).

Preparation of Ink RGJ-2

Thereafter, comparative ink RGJ-2 was obtained in the same manner as in Example 1 except that the comparative pigment dispersion RPD-2 was used instead of the pigment dispersion PD-1 in the ink preparation of Example 1.

Comparative Example 2

Preparation of Pigment Dispersion RPD-3

6.0 parts of Copolymer RCP-2 was dissolved in 50.0 parts of diethanol amine aqueous solution in such a manner that pH was 8.0. Moreover, deionized water was added to make the total amount of the aqueous solution to be 84.0 parts. 20.0 parts of Pigment Red 122 (TONER MAGENTA E02, manufactured by Clariant (Japan) KK, was added to 84.0 parts of the thus-obtained aqueous solution followed by stirring for 12 hours.

The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 97.0 parts of Pigment dispersion RPD-3 (solid pigment portion concentration of 20 percent).

Preparation of Ink RGJ-3

Thereafter, comparative ink RGJ-3 was obtained in the same manner as in Example 1 except that the comparative pigment dispersion RPD-3 was used instead of the pigment dispersion PD-7 in the ink preparation of Example 7.

Comparative Example 3

Preparation of Pigment Dispersion RPD-4

6.0 parts of Copolymer RCP-2 was dissolved in 50.0 parts of diethanol amine aqueous solution in such a manner that pH was 8.0. Moreover, deionized water was added to make the total amount of the aqueous solution to be 80.0 parts. 20.0 parts of Pigment Blue 15:3 (CHROMOFINE BLUE A-220JC, manufactured by Dainichiseika Color & Chemicals Mfg. Co., Ltd.) was added to 80.0 parts of the thus-obtained aqueous solution followed by stirring for 12 hours.

The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 97.0 parts of Pigment dispersion RPD-4 (solid pigment portion concentration of 20 percent).

Preparation of Ink RGJ-4

Thereafter, comparative ink RGJ-4 was obtained in the same manner as in Example 1 except that the comparative pigment dispersion RPD-4 was used instead of the pigment dispersion PD-11 in the ink preparation of Example 11.

Comparative Example 4

Preparation of Pigment Dispersion RPD-5

6.0 parts of Copolymer RCP-2 was dissolved in 50.0 parts of diethanol amine aqueous solution in such a manner that pH was 8.0. Moreover, deionized water was added to make the total amount of the aqueous solution to be 80.0 parts. 20.0 parts of Pigment Yellow 74 (FAST YELLOW 531, manufactured by Dainichiseika Color & Chemicals Mfg. Co., Ltd.) was added to 80.0 parts of the thus-obtained aqueous solution followed by stirring for 12 hours.

The thus-obtained mixture was subjected to circulation dispersion using a disk type bead mill (KDL type, media: zirconia ball having a diameter of 0.1 mm, manufactured by Shinmaru Enterprises Corporation) at a peripheral speed of 10 m/s for one hour followed by filtration by a membrane filter having an average pore diameter of 1.2 micro meter. Thereafter, deionized water was added for balance to obtain 97.0 parts of Pigment dispersion RPD-5 (solid pigment portion concentration of 20 percent).

Preparation of Ink RGJ-5

Thereafter, comparative ink RGJ-5 was obtained in the same manner as in Example 1 except that the comparative pigment dispersion RPD-5 was used instead of the pigment dispersion PD-9 in the ink preparation of Example 9.

Properties of the ink prepared in Examples 1 to 12 and Comparative Examples 1 to 4 were evaluated in the following manner. The results are shown in Table 4.

Storage Stability of Ink

An ink cartridge was filled with each ink and stored at 70 degrees C. for one week. The change ratio was obtained from the following relation and evaluated according to the following criteria.

$$\text{Change ratio of viscosity (\%)} = (\text{Viscosity of ink after storage} - \text{Viscosity of ink before storage})/(\text{Viscosity of ink before storage}) \times 100$$

Viscosity was measured by a viscometer (RE80L, manufactured by TOKI SANGYO CO., LTD.) to measure the viscosity of the ink at 25 degrees C. at 50 rotations.

Evaluation Criteria

A: Change ratio of viscosity within the range of from −5% to +5%

B: Change ratio of viscosity within the range of from −8% to less than −5% and more than 5% to 8%

C: Change ratio of viscosity within the range of from −10% to less than −8% and more than 8% to 10%.

D: Change ratio of viscosity within the range of from less than −10% to −30% and more than 10% to 30%

E: Change ratio of viscosity less than −30% or greater than 30% (gelated, evaluation was not possible)

Image Density

An inkjet printer (IPSiO GX5000, manufactured by RICOH Co., Ltd.) was filled with each ink at 23 degrees C. and 50% RH. A chart of general symbols of 64 point JIS X 0208 (1997), 2223 prepared by Microsoft Word 2000 (manufactured by Microsoft Corporation) was printed on plain paper (MyPaper, manufactured by Ricoh Co., Ltd.) and coated paper (Lumiart gloss paper, thickness of 90 g/m$^2$, manufactured by Stora Enso Oyj) followed by drying at 100 degrees C. for one minute. The color of the symbol portion of the printed surface was measured by X-Rite 938 (manufactured by X-Rite Inc.) and evaluated according to the following evaluation criteria.

The print mode was: A mode in which "Plain Paper—Standard Fast" was modified to "No Color Calibration" from the user setting for plain paper by the driver installed onto the printer.

The symbol according to JIS X 0208 (1997), 2223 includes a square for the exterior with the inside thereof entirely printed with ink.

Evaluation Criteria
Image Density 1 (Plain Paper)
A: 1.25 or higher
B: 1.20 to less than 1.25
C: 1.10 to less than 1.20
D: Less than 1.10
E: Pigment was gelated and not dispersed in ink, impossible to print symbols.
Image Density 2 (Coated Paper)
A: 1.90 or higher
B: 1.80 to less than 1.90
C: 1.70 to less than 1.80
D: Less than 1.70
E: Pigment was gelated and not dispersed in ink, impossible to print symbols.

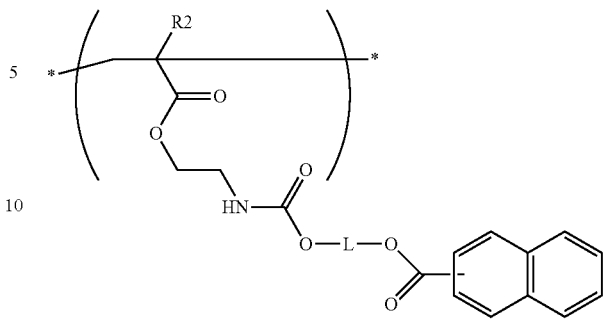

(2)

TABLE 4

| | Kind of pigment | Cross-linking Agent | | Storage Stability of Ink | Image quality | |
|---|---|---|---|---|---|---|
| | | Kind | Proportion (percent) in copolymer | Viscosity change ratio | Image Density 1 | Image Density 2 |
| Example 1 | Black | EX-850 | 1.0 | A | A | A |
| Example 2 | Black | EX-850 | 0.1 | A | A | A |
| Example 3 | Black | EX-850 | 5.0 | A | A | A |
| Example 4 | Black | EX-850 | 10.0 | A | A | B |
| Example 5 | Black | EX-830 | 2.5 | A | A | A |
| Example 6 | Black | EX-941 | 2.5 | A | A | A |
| Example 7 | Black | EX-313 | 2.5 | A | A | A |
| Example 8 | Black | EX-512 | 2.5 | A | A | B |
| Example 9 | Black | EX-614 | 2.5 | A | A | A |
| Example 10 | Magenta | EX-850 | 1.0 | A | A | A |
| Example 11 | Cyan | EX-850 | 1.0 | A | A | A |
| Example 12 | Yellow | EX-850 | 1.0 | A | A | A |
| Comparative Example 1 | Black | EX-850 | 15.0 | E | E | E |
| Comparative Example 2 | Black | None | — | A | B | D |
| Comparative Example 3 | Magenta | None | — | A | B | B |
| Comparative Example 4 | Cyan | None | — | A | B | B |
| Comparative Example 5 | Yellow | None | — | A | B | B |

As seen in the results shown in Table 4, image density was found to be high when using each ink of Examples 1 to 12 containing the copolymer having a cross-linked structure formed by the structure unit represented by Chemical formula 1, the structure unit represented by Chemical formula 2, and the cross-linking agent in comparison with each ink of Comparative Examples 1 to 4.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink, comprising: water; a coloring material; and a cross-linked copolymer comprising, in polymerized form, a cross-linking agent, a first structure unit formula (1), and a second structure unit of formula (2),

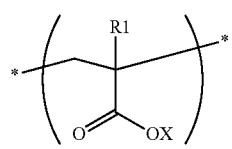

(1)

wherein
X is a hydrogen atom or a cation,
R1 is a hydrogen atom or a methyl group,
R2 is a hydrogen atom or a methyl group,
L is an alkylene group comprising 2 to 18 carbon atoms, and * is an atomic bond,
wherein the cross-linking agent is present in the copolymer in an amount of no more than 10.0 wt. %, relative to a total copolymer weight.

2. The ink of claim 1, wherein the cross-linking agent comprises two or more epoxy groups.

3. The ink according to claim 2, wherein the copolymer is present in an amount in a range of from 0.3 to 5 wt. %, bases on a total ink weight,
wherein a molar ratio of the first structure unit to the second structure unit is in a range of from 0.5/1 to 3/1 in the ink, and
wherein the copolymer has a weight average molecular weight in a range of from 5,000 to 40,000.

4. The ink of claim 1, wherein a proportion of the cross-linking agent in the copolymer is in a range of from 0.05 to less than 10 wt. %.

5. The ink of claim 1, wherein a molar ratio of the first structure unit to the second structure unit is in a range of from 0.5/1 to 3/1 in the ink.

6. The ink of claim 1, wherein the copolymer has a weight average molecular weight in a range of from 5,000 to 40,000.

7. The ink of claim 1, wherein the coloring material comprises a pigment.

8. An ink cartridge, comprising:
the ink of claim 1; and
an ink accommodating unit accommodating the ink.

9. An image forming method, comprising:
applying the ink of claim 1 to a recording medium; and
thermally drying the ink applied to the recording medium.

10. A method of manufacturing the ink of claim 1, comprising:
mixing the cross-linked copolymer with water and the coloring material.

11. The ink according to claim 1, wherein the cross-linking agent comprises ethyleneglycol diglycidylether, polyethyleneglycol diglycidylether, propyleneglycol diglycidylether, polypropyleneglycol diglycidylether, resorcinol diglycidylether, neopentylglycol diglycidylether, 1,6-hexane diol diglycidylether, dibromoneopentylglycol diglycidylether, hydrogenated bisphenol A diglycidylether, terephthalic acid diglycidylester, phthalic acid diglycidylester, hydrogenated diglycidylester sorbitol polyglycidyl ether, glycerol polyglycidyl ether, diglycerol polyglycidyl ether, polyglycerol glycidylether, trimethylol propane polyglycidyl ether, pentaerythritol glycidyl ether, and/or cresolnovolac type epoxy emulsion.

12. The ink according to claim 1, wherein the cross-linking agent comprises polyethyleneglycol diglycidylether.

13. The ink according to claim 1, wherein the copolymer is present in an amount in a range of from 0.1 to 5 wt. %, bases on a total ink weight.

14. The ink according to claim 1, wherein the copolymer is present in an amount in a range of from 0.3 to 5 wt. %, bases on a total ink weight.

15. The ink according to claim 1, wherein the cross-linking agent comprises ethyleneglycol diglycidylether, polyethyleneglycol diglycidylether, propyleneglycol diglycidylether, polypropyleneglycol diglycidylether, resorcinol diglycidylether, neopentylglycol diglycidylether, 1,6-hexane diol diglycidylether, dibromoneopentylglycol diglycidylether, hydrogenated bisphenol A diglycidylether, terephthalic acid diglycidylester, phthalic acid diglycidylester, hydrogenated diglycidylester sorbitol polyglycidyl ether, glycerol polyglycidyl ether, diglycerol polyglycidyl ether, polyglycerol glycidylether, trimethylol propane polyglycidyl ether, pentaerythritol glycidyl ether, and/or cresolnovolac type epoxy emulsion, and
wherein the copolymer is present in an amount in a range of from 0.1 to 10 wt. %, bases on a total ink weight.

16. The ink according to claim 1, wherein the copolymer is present in an amount in a range of from 0.1 to 10 wt. %, bases on a total ink weight,
wherein a molar ratio of the first structure unit to the second structure unit is in a range of from 0.5/1 to 3/1 in the ink, and
wherein the copolymer has a weight average molecular weight in a range of from 5,000 to 40,000.

17. The ink according to claim 1, wherein the second structure unit comprises, in polymerized form,

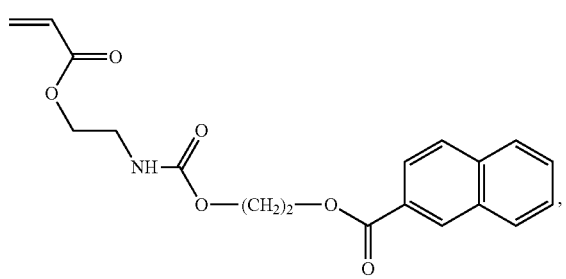

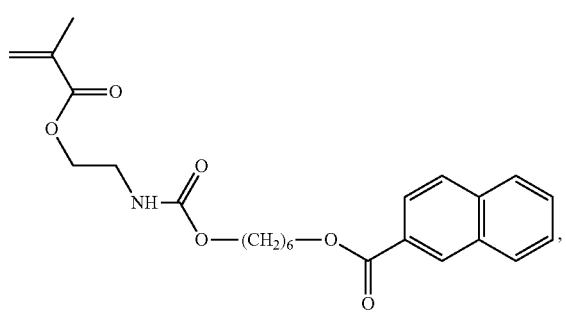

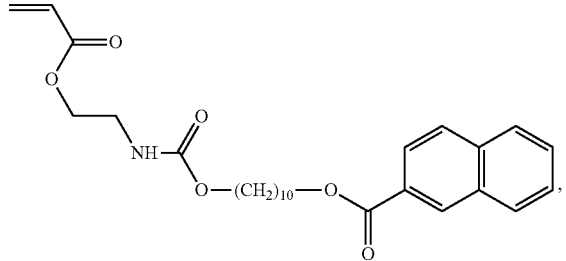

and/or

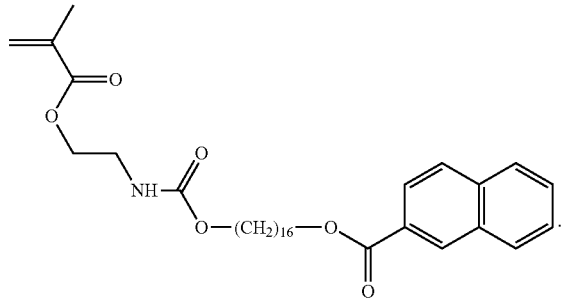

18. The ink according to claim 1, wherein the second structure unit comprises, in polymerized form,

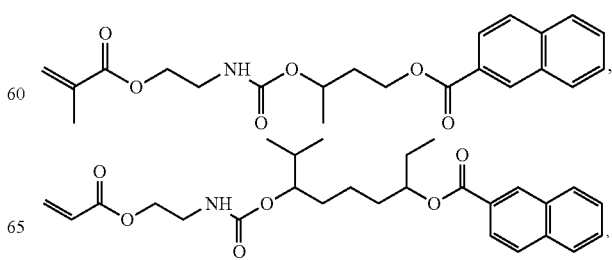

-continued

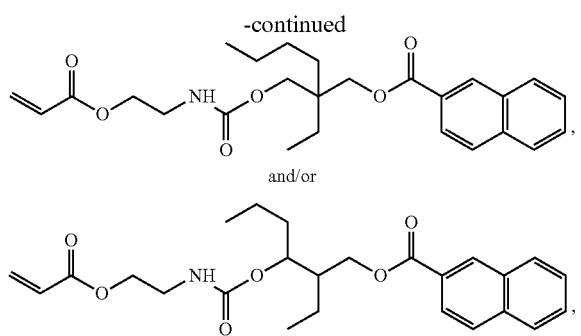

and/or

19. Printed matter, comprising:
a recording medium; and
an image on the recording medium,
wherein the image comprises a coloring material and a cross-linked copolymer comprising, in polymerized form, a cross-linking agent, a structure unit of formula (1), and a structure unit of formula (2)

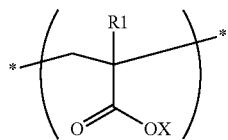 (1)

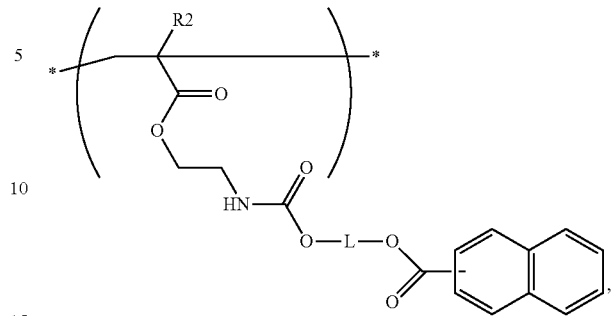

wherein

X is a hydrogen atom or a cation,

R1 is a hydrogen atom or a methyl group,

R2 is a hydrogen atom or a methyl group,

L is an alkylene group comprising 2 to 18 carbon atoms, and

* is an atomic bond, wherein the cross-linking agent is present in the copolymer in an amount of no more than 10.0 wt. %, relative to a total copolymer weight.

* * * * *